(12) United States Patent
Wiedemann et al.

(10) Patent No.: US 11,359,091 B2
(45) Date of Patent: Jun. 14, 2022

(54) POLYAMIDE MOLDING COMPOUND

(71) Applicant: EMS-PATENT AG, Domat/Ems (CH)

(72) Inventors: Thomas Wiedemann, Domat/Ems (CH); Botho Hoffmann, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 18 days.

(21) Appl. No.: 16/956,580

(22) PCT Filed: Dec. 6, 2018

(86) PCT No.: PCT/EP2018/083828
§ 371 (c)(1),
(2) Date: Jun. 20, 2020

(87) PCT Pub. No.: WO2019/121041
PCT Pub. Date: Jun. 27, 2019

(65) Prior Publication Data
US 2021/0115250 A1 Apr. 22, 2021

(30) Foreign Application Priority Data

Dec. 22, 2017 (EP) .................................... 17210050

(51) Int. Cl.
C08L 77/06 (2006.01)

(52) U.S. Cl.
CPC ............ C08L 77/06 (2013.01); C08L 2201/08 (2013.01); C08L 2205/025 (2013.01)

(58) Field of Classification Search
CPC ................. C08L 77/06; C08L 2205/02; C08L 2205/025; C08L 2205/03; C08L 2205/035
See application file for complete search history.

(56) References Cited

U.S. PATENT DOCUMENTS

| 6,008,288 | A | 12/1999 | Dalla Torre |
| 6,528,560 | B2 | 3/2003 | Bühler |
| 7,723,411 | B2 | 5/2010 | Schneider |
| 7,973,191 | B2 | 7/2011 | Doring et al. |
| 8,022,170 | B2 | 9/2011 | Hoffman et al. |
| 8,138,243 | B2 | 3/2012 | Bühler et al. |
| 8,268,956 | B2 | 9/2012 | Bühler et al. |
| 8,383,244 | B2 | 2/2013 | Bayer et al. |
| 8,404,323 | B2 | 3/2013 | Pfleghar et al. |
| 8,586,662 | B2 | 11/2013 | Harder et al. |
| 8,604,120 | B2 | 12/2013 | Stöppelmann et al. |
| 8,993,662 | B2 | 3/2015 | Kaplan |
| 9,109,115 | B2 | 8/2015 | Bühler |
| 9,133,322 | B2 | 9/2015 | Roth et al. |
| 9,359,532 | B2 | 6/2016 | Kaplan |
| 9,453,106 | B2 | 9/2016 | Bühler et al. |
| 9,644,081 | B2 | 5/2017 | Aepli et al. |
| 9,663,655 | B2 | 5/2017 | Aepli |
| 9,815,967 | B2 | 11/2017 | Harder et al. |
| 9,963,547 | B2 | 5/2018 | Hoppe et al. |
| 9,963,591 | B2 | 5/2018 | Bayer et al. |
| 9,969,882 | B2 | 5/2018 | Thomas et al. |
| 10,005,268 | B2 | 6/2018 | Jeltsch et al. |
| 10,047,054 | B2 | 8/2018 | Kaplan |
| 10,144,805 | B2 | 12/2018 | Bayer et al. |
| 10,233,326 | B2 | 3/2019 | Koch et al. |
| 10,544,286 | B2 | 1/2020 | Nakano et al. |
| 10,577,478 | B2 | 3/2020 | Fujii et al. |
| 10,683,418 | B2 | 6/2020 | Thomas et al. |
| 10,717,816 | B2 | 7/2020 | Aepli et al. |
| 10,751,961 | B2 | 8/2020 | Cheung |
| 10,767,047 | B2 | 9/2020 | Aepli et al. |
| 10,767,048 | B2 | 9/2020 | Aepli et al. |
| 10,836,905 | B2 | 11/2020 | Wiedemann et al. |
| 10,843,389 | B2 | 11/2020 | Weis et al. |
| 2001/0031805 | A1 | 10/2001 | Bühler |
| 2006/0235190 | A1 | 10/2006 | Hoffman et al. |
| 2006/0264542 | A1 | 11/2006 | Schneider |
| 2008/0135720 | A1 | 6/2008 | Bühler et al. |
| 2008/0300347 | A1 | 12/2008 | Kurz et al. |
| 2009/0085019 | A1 | 4/2009 | Buhler |
| 2010/0069657 | A1 | 3/2010 | Doring et al. |
| 2010/0168423 | A1 | 7/2010 | Doring et al. |

(Continued)

FOREIGN PATENT DOCUMENTS

| EP | 1 992 659 | A1 | 11/2008 |
| EP | 2 952 319 | A1 | 12/2015 |

OTHER PUBLICATIONS

US 10,875,999 B2, 12/2020, Stöppelmann et al. (withdrawn)
European Patent Office, International Search Report in International Application No. PCT/EP2018/083828 (dated Mar. 11, 2019).
European Patent Office, Written Opinion in International Application No. PCT/EP2018/083828 (dated Mar. 11, 2019).
International Bureau of WIPO, International Preliminary Report on Patentability in International Application No. PCT/EP2018/083828 (dated Jun. 23, 2020).
U.S. Appl. No. 09/533,280, filed Mar. 22, 2000.

(Continued)

Primary Examiner — Ana L. Woodward
(74) Attorney, Agent, or Firm — Leydig, Voit & Mayer, Ltd.

(57) ABSTRACT

The present invention relates to a polyamide molding compound which contains the following components (A) to (C) or consist of these components: (A) 50 to 98% by weight of at least one specific amorphous or microcrystalline copolyamide constituted by the specific monomers (a1) to (a4); (B) 2 to 40% by weight of at least one semi-crystalline polyamide which is selected from the group consisting of PA 612, PA 6/12, PA 516, PA 614, PA 616, PA 618, PA 1012, PA 1014, PA 1016, PA 1018 and mixtures thereof; and (C) 0 to 20% by weight of at least one additive; the constituent amounts of the components (A) to (C) adding up to 100% by weight. The invention also relates to molded articles made of said polyamide molding compound and the use thereof.

19 Claims, No Drawings

(56) References Cited

U.S. PATENT DOCUMENTS

| | | |
|---|---|---|
| 2010/0279111 A1 | 11/2010 | Harder et al. |
| 2011/0220667 A1 | 9/2011 | Pfleghar et al. |
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0136911 A1 | 5/2013 | Bender et al. |
| 2013/0317168 A1 | 11/2013 | Bühler et al. |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Bühler |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0369098 A1 | 12/2016 | Yasuda et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1* | 6/2017 | Sutterlin ............... C08G 69/26 |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171074 A1* | 6/2018 | Wiedemann ......... C08G 69/265 |
| 2018/0171141 A1 | 6/2018 | Thomas et al. |
| 2018/0251600 A1 | 9/2018 | Hoffmann et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |
| 2020/0024415 A1 | 1/2020 | Holzschuh et al. |
| 2020/0024416 A1 | 1/2020 | Holzschuh et al. |
| 2020/0109284 A1 | 4/2020 | Wiedemann |
| 2020/0198203 A1 | 6/2020 | Caviezel |

OTHER PUBLICATIONS

U.S. Appl. No. 10/536,494, filed May 24, 2005.
U.S. Appl. No. 10/553,259, filed Oct. 11, 2005.
U.S. Appl. No. 11/950,964, filed Dec. 5, 2007.
U.S. Appl. No. 12/091,024, filed Apr. 21, 2008.
U.S. Appl. No. 12/540,007, filed Aug. 12, 2009.
U.S. Appl. No. 12/539,972, filed Aug. 12, 2009.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/290,718, filed Nov. 7, 2011.
U.S. Appl. No. 13/421,541, filed Mar. 15, 2012.
U.S. Appl. No. 13/481,451, filed May 25, 2012.
U.S. Appl. No. 13/674,395, filed Nov. 12, 2012.
U.S. Appl. No. 13/800,102, filed Mar. 13, 2013.
U.S. Appl. No. 13/971,376, filed Aug. 20, 2013.
U.S. Appl. No. 13/898,099, filed May 20, 2013.
U.S. Appl. No. 14/078,134, filed Nov. 12, 2013.
U.S. Appl. No. 14/221,930, filed Mar. 21, 2014.
U.S. Appl. No. 14/205,667, filed Mar. 12, 2014.
U.S. Appl. No. 14/204,404, filed Mar. 11, 2014.
U.S. Appl. No. 14/504,651, filed Oct. 2, 2014.
U.S. Appl. No. 14/397,529, filed Oct. 28, 2014.
U.S. Appl. No. 14/397,534, filed Oct. 28, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/935,642, filed Nov. 9, 2015.
U.S. Appl. No. 14/915,031, filed Feb. 26, 2016.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,891, filed Mar. 2, 2018.
U.S. Appl. No. 15/955,737, filed Apr. 18, 2018.
U.S. Appl. No. 16/115,055, filed Aug. 28, 2018.
U.S. Appl. No. 16/104,028, filed Aug. 16, 2018.
U.S. Appl. No. 16/104,035, filed Aug. 16, 2018.
U.S. Appl. No. 16/104,043, filed Aug. 16, 2018.
U.S. Appl. No. 16/094,198, filed Oct. 16, 2018.
U.S. Appl. No. 16/515,119, filed Jul. 18, 2019.
U.S. Appl. No. 16/515,151, filed Jul. 18, 2019.
U.S. Appl. No. 16/595,559, filed Oct. 8, 2019.
U.S. Appl. No. 16/717,369, filed Dec. 17, 2019.
U.S. Appl. No. 16/956,564, filed Jun. 20, 2020.
U.S. Appl. No. 16/956,576, filed Jun. 20, 2020.
U.S. Appl. No. 16/956,579, filed Jun. 20, 2020.
U.S. Appl. No. 16/987,913, filed Aug. 7, 2020.
U.S. Appl. No. 16/988,011, filed Aug. 7, 2020.

* cited by examiner

POLYAMIDE MOLDING COMPOUND

CROSS-REFERENCE TO RELATED APPLICATIONS

This patent application is the U.S. national phase of International Application No. PCT/EP2018/083828, filed on Dec. 6, 2018, which claims the benefit of European Patent Application No. 17210050.5, filed Dec. 22, 2017, the disclosures of which are incorporated herein by reference in their entireties for all purposes.

The present invention relates to polyamide moulding compounds which are based on a mixture of specific amorphous polyamides and specific partially crystalline polyamides and are distinguished by a very good stress crack resistance and, at the same time, by very good optical properties, in particular a high light transmission and a low haze.

Furthermore, the present invention relates to moulded articles made from the polyamide moulding compound according to the invention and uses of the polyamide moulding compound for the production of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g., USB sticks), protective covers for mobile phones, trim parts in the computer and telecommunication field, pipes, hoses and components of e-cigarettes.

Mixtures of amorphous and partially crystalline polyamides are already described in the state of the art.

EP 1 992 659 A1 describes a polyamide moulding compound melt for the production of transparent moulded parts which have, for light up to a wavelength of 400 nm, a reduced transmission. The polyamide moulding compound is based on a mixture of transparent polyamides or a blend of transparent polyamides with at least one partially crystalline polyamide.

EP 2 952 319 A1 relates to a method for low-stress injection moulding of amorphous or microcrystalline polyamides in which a melt of the amorphous or microcrystalline polyamides is processed and injection moulded in specific conditions. Hence, low-stress moulded articles can be produced from the amorphous or microcrystalline polyamides by injection moulding. A part of the amorphous or microcrystalline polyamide can thereby be replaced by a partially crystalline polyamide.

US 2016/0369098 A1 relates to the use of at least one partially crystalline polyamide in a glass-reinforced amorphous polyamide resin, in order to produce a composition which is more transparent than the resin.

Starting therefrom, the object was to provide a polyamide moulding compound, which, relative to the unmodified base copolyamide (A), displays improved stress crack resistance, with as low losses as possible as regards the optical properties expressed by a low haze and a high light transmission.

This object is achieved by the polyamide moulding compound described herein which has the following features.

Polyamide moulding compound comprising the following components (A) to (C) or consisting of these components:
(A) 50 to 98% by weight of at least one amorphous copolyamide formed from monomers (a1) to (a4):
  (a1) 50 to 80% by mol of at least one acyclic, aliphatic diamine with 6 to 10 carbon atoms;
  (a2) 20 to 50% by mol of at least one cycloaliphatic diamine with 6 to 36 carbon atoms;
  (a3) 40 to 80% by mol of at least one aromatic dicarboxylic acid;
  (a4) 20 to 60% by mol of at least one acyclic, aliphatic dicarboxylic acid with 8 to 16 carbon atoms;
  the proportions of monomers (a1) and (a2) being relative to the sum of the diamines used and adding up in total to 100% by mol; and
  the proportions of monomers (a3) and (a4) being relative to the sum of the dicarboxylic acids used and adding up in total to 100% by mol;
(B) 2 to 40% by weight of at least one partially crystalline polyamide selected from the group consisting of PA 516, PA 612, PA 6/12, PA 614, PA 616, PA 618, PA 1012, PA 1014, PA 1016, PA 1018, and mixtures hereof; and
(C) 0 to 20% by weight of at least one additive;
the quantities of components (A) to (C) adding up in total to 100% by weight.

Advantageous embodiments of the polyamide moulding compound according to the invention are also described herein.

Furthermore, the present invention relates to moulded articles which are producible from the polyamide moulding compound according to the invention. Advantageous embodiments of these moulded articles and uses of the polyamide moulding compound according to the invention are also described.

DEFINITIONS OF TERMS

Spellings and Abbreviations for Polyamides and the Monomers Thereof

In the sense of the present invention there is understood by the term "polyamide" (abbreviation PA) a generic term including homopolyamides and copolyamides. The chosen spellings and abbreviations for polyamides and the monomers thereof correspond to those set in the ISO standard 16396-1 (2015, (D)). The abbreviations used therein are synonymous in the following with the IUPAC names of the monomers. In particular the following abbreviations for monomers appear in the present application, MACM for bis(4-amino-3-methylcyclohexyl)methane (also termed 3,3'-dimethyl-4,4'-diaminodicyclohexylmethane, CAS-no. 6864-37-5), EACM for bis(4-amino-3-ethycyclohexyl)methane (also termed 3,3'-diethyl 4,4'-diaminodicyclohexylmethane, CAS-no. 10644114-65-3), TMDC for bis(4-amino-3,5-dimethylcyclohexyl)methane (also termed 3,3',5,5'-tetramethyl-4,4'-diaminodicyclohexylmethane, CAS-no. 65962-45-0), PACP for 2,2-bis(p-aminocyclohexyl)propane (CAS-no. 3377-24-0), PACM for bis(4-aminocyclohexyl)methane (also termed 4,4'-diaminodicyclohexylmethane, CAS-no. 1761-71-3), T for terephthalic acid (CAS-no. 100-21-0), I for isophthalic acid (CAS-no. 121-95-5), 12 for dodecanedioic acid (also termed 1,10-decanedicarboxylic acid, CAS-no. 693-23-2), 16 for hexadecanedioic acid (CAS-no. 505-54-4), 6 for 1,6-hexanediamine (CAS-no. 124-09-4), 12 for laurinlactam (CAS-no. 947-04-6) and 12 for co-aminodo-decanoic acid (CAS-no. 693-57-2).

Amorphous Polyamides

Amorphous polyamides display, in dynamic differential scanning calorimetry (DSC) according to ISO 11357-3 (2013) with a heating rate of 20 K/min, preferably a melting heat of max. 5 J/g, particularly preferably of max. 3 J/g, and very particularly preferably of 0 to 1 J/g, and have no melting point.

Microcrystalline Polyamides

Microcrystalline polyamides have a melting point. Furthermore, they display a higher melting heat than amorphous polyamides.

In General with Respect to Quantities

The polyamide moulding compounds according to the present invention comprise components (A), (B) and possibly (C) or preferably consist exclusively of these, the proviso thereby applies that components (A), (B) and (C) add up in total to 100% by weight. The set ranges of the quantities for the individual components (A), (B) and (C) should be understood such that, within the prescribed ranges, an arbitrary quantity for each of the individual components can be selected provided the strict proviso is fulfilled that the sum of all the components (A) to (C) produces 100% by weight.

The diamine monomers (a1) and (a2) contained in copolyamide (A) add up in total to 100% by mol, and the diacid monomers (a3) and (a4) contained in copolyamide (A) likewise add up in total to 100% by mol. The set ranges of the quantities for the individual monomers should be understood such that, within the prescribed ranges, an arbitrary quantity for each of the individual components can be selected provided the strict proviso is fulfilled that the sum of all the diamine monomers and diacid monomers contained in copolyamide (A) produces respectively 100% by mol.

Polyamide Moulding Compound

The polyamide moulding compound according to the invention comprises components (A) to (C) or consists of these.

According to a preferred embodiment of the present invention, the proportion of component (A) in the polyamide moulding compound is in the range of 55 to 95.9% by weight, preferably of 69 to 94.7% by weight or 69 to 93.7% by weight and particularly preferably of 76 to 91.5% by weight, relative to the total weight of the polyamide moulding compound.

According to a further preferred embodiment of the present invention, the proportion of component (B) in the polyamide moulding compound is in the range of 4 to 35% by weight, preferably of 5 to 25% by weight or 6 to 25% by weight, particularly preferably of 8 to 20% by weight and very particularly preferably of 10 to 15% by weight, relative to the total weight of the polyamide moulding compound.

A further preferred embodiment provides that the proportion of component (C) in the polyamide moulding compound is in the range of 0.1 to 20% by weight, preferably of 0.3 to 6% by weight and particularly preferably of 0.5 to 4% by weight, relative to the total weight of the polyamide moulding compound.

According to a preferred embodiment of the present invention, the proportion of component (A) in the polyamide moulding compound is in the range of 55 to 95.9% by weight, preferably of 69 to 94.7% by weight or 69 to 93.7% by weight and particularly preferably of 76 to 91.5% by weight, and the proportion of component (B) in the polyamide moulding compound is in the range of 4 to 35% by weight, preferably of 5 to 25% by weight or 6 to 25% by weight, particularly preferably of 8 to 20% by weight and very particularly preferably of 10 to 15% by weight, and the proportion of component (C) in the polyamide moulding compound is in the range of 0.1 to 20% by weight, preferably of 0.3 to 6% by weight and particularly preferably of 0.5 to 4% by weight, respectively relative to the total weight of the polyamide moulding compound.

According to another preferred embodiment of the present invention, the haze of the polyamide moulding compound, measured on a moulded article produced from the polyamide moulding compound (2 mm thick plates with width and length: 60×60 mm) according to ASTM D1003 is <15%, preferably <10%, particularly preferably <8% and very particularly preferably <1.0%.

A further preferred embodiment of the present invention provides that the light transmission, measured on a moulded article produced from the polyamide moulding compound (2 mm thick plates with width and length: 60×60 mm) according to ASTM D1003, is at least 80%, preferably at least 85% and particularly preferably at least 90%.

According to a preferred embodiment of the present invention, a test piece made of the polyamide moulding compound according to the invention
- has a modulus of elasticity in tension, determined according to ISO 527, of at least 2,000 MPa, preferably at least 2,100 MPa and particularly preferably at least 2,150 MPa; and/or
- has a stress crack resistance in diethylene glycol, determined according to DIN 53449-3 (1984) bending strip method, of at least 12 MPa, preferably at least 22 MPa and particularly preferably at least 27 MPa; and/or
- has a stress crack resistance in toluene, determined according to DIN 53449-3 (1984) bending strip method, of at least 17 MPa, preferably at least 27 MPa and particularly preferably at least 30 MPa; and/or
- has a stress crack resistance in n-hexane, determined according to DIN 53449-3 (1984) bending strip method, of at least 23 MPa, preferably at least 30 MPa and particularly preferably at least 35 MPa.

Another preferred embodiment of the present invention provides that a test piece made of the polyamide moulding compound according to the invention
- has a modulus of elasticity in tension, determined according to ISO 527, of at least 2,000 MPa, preferably at least 2,100 MPa and particularly preferably at least 2,150 MPa; and/or
- has a stress crack resistance in diethylene glycol, determined according to DIN 53449-3 (1984) bending strip method, of at least 12 MPa, preferably at least 22 MPa and particularly preferably at least 27 MPa; and/or
- has a stress crack resistance in toluene, determined according to DIN 53449-3 (1984) bending strip method, of at least 17 MPa, preferably at least 27 MPa and particularly preferably at least 30 MPa; and/or
- has a stress crack resistance in n-hexane, determined according to DIN 53449-3 (1984) bending strip method, of at least 23 MPa, preferably at least 30 MPa and particularly preferably at least 35 MPa, and
the haze of the polyamide moulding compound, measured on a moulded article produced from the polyamide moulding compound (2 mm thick plates with width and length: 60×60 mm) according to ASTM D1003, is <15%, preferably <10%, particularly preferably <8% and very particularly preferably <1.0%, and
the light transmission, measured on a moulded article produced from the polyamide moulding compound (2 mm thick plates with width and length: 60×60 mm) according to ASTM D1003, is at least 80%, preferably at least 85% and particularly preferably at least 90%.

According to a preferred embodiment of the present invention, the polyamide moulding compound according to the invention is free of glass fibres.

In a particularly preferred embodiment, the polyamide moulding compound according to the invention is free of fibrous fillers.

According to a preferred embodiment, the moulding compound comprises precisely one copolyamide (A) and precisely one partially crystalline polyamide (B).

In the following, preferred embodiments for components (A) to (C) are indicated.

Component (A)

Component (A) is at least one amorphous copolyamide formed from monomers (a1) to (a4):
(a1) 50 to 80% by mol of at least one acyclic, aliphatic diamine with 6 to 10 carbon atoms;
(a2) 20 to 50% by mol of at least one cycloaliphatic diamine with 6 to 36 carbon atoms;
(a3) 40 to 80% by mol of at least on aromatic dicarboxylic acid;
(a4) 20 to 60% by mol of at least one acyclic, aliphatic dicarboxylic acid with 8 to 16 carbon atoms;
the proportions of monomers (a1) and (a2) being relative to the sum of the diamines used and adding up in total to 100% by mol; and
the proportions of monomers (a3) and (a4) being relative to the sum of the dicarboxylic acids used and adding up in total to 100% by mol.

According to a preferred embodiment of the present invention, monomer (a1) concerns a linear or branched diamine with 6 to 8 carbon atoms, particularly preferably 1,6-hexamethylenediamine and/or 2-methyl-1,5-pentanediamine.

Another preferred embodiment provides that monomer (a2) concerns a cycloaliphatic diamine with 12 to 20 carbon atoms, which is preferably selected from the group consisting of bis(4-amino-3-methylcyclohexyl) methane (MACM), bis(4-aminocyclohexyl)methane (PACM), 2,2-bis(4-aminocyclohexyl)propane (PACP), 2,2-bis(4-amino-3-methylcyclohexyl)propane (MACP), bis(4-amino-3-ethylcyclohexyl) methane (EACM), 2,2-bis(4-amino-3-ethylcyclohexyl) propane (EACP), bis(4-amino-3,5-dimethylcyclohexyl) methane (TMACM), 2,2-bis(4-amino-3,5-dimethycyclohexyl)propane (TMACP) and mixtures thereof, bis(4-amino-3-methylcyclohexyl)methane (MACM), bis(4-aminocyclohexyl)methane (PACM) and mixtures thereof being particularly preferred.

According to another preferred embodiment, monomer (a3) concerns an aromatic dicarboxylic acid with 6 to 36 carbon atoms, which is preferably selected from the group consisting of terephthalic acid (TPS), naphthalenedicarboxylic acid (NDA), including 1,5-naphthalenedicarboxylic acid and 2,6-naphthalenedicarboxylic acid, isophthalic acid (IPS), biphenyldicarboxylic acids, preferably biphenyl-2,2'-dicarboxylic acid, 4,4'-diphenyldicarboxylic acid, 3,3'-diphenyldicarboxylic acid, 4,4'-diphenyletherdicarboxylic acid, 4,4'-diphenylmethanedicarboxylic acid and 4,4'-diphenylsuphonedicarboxylic acid, 1,5-anthracenedicarboxylic acid, p-terphenylene-4,4"-dicarboxylic acid and 2,5-pyridinedicarboxylic acid and mixtures thereof, terephthalic acid and isophthalic acid and mixtures thereof being particularly preferred.

A further preferred embodiment of the present invention provides that monomer (a4) concerns an acyclic, linear or branched aliphatic dicarboxylic acid with 10 to 14 carbon atoms, which is selected preferably from the group consisting of decanedioic acid, undecanedioic acid, dodecanedioic acid, tridecanedioic acid, tetradecanedioic acid and mixtures thereof, particularly preferably dodecanedioic acid and particularly preferably exclusively dodecanedioic acid being used.

According to a further preferred embodiment of the present invention, a mixture of terephthalic acid and isophthalic acid is used as monomer (a3), preferably in a molar ratio of 2:1 to 1:2, in particular in a ratio of 1.5:1 to 1:1.5, particularly preferably an equimolar mixture of terephthalic acid and isophthalic acid being used.

According to a further preferred embodiment of the present invention, the proportion of monomer (a1) in the copolyamide is in the range of 55 to 80% by mol, preferably in the range of 60 to 77% by mol, and/or the proportion of monomer (a2) in the copolyamide in the range of 20 to 45% by mol, preferably in the range of 23 to 40% by mol, the proportions of monomers (a1) and (a2) being relative to the sum of the diamines used and adding up in total to 100% by mol.

Another preferred embodiment of the present invention provides that the proportion of monomer (a3) in the copolyamide is in the range of 50 to 80% by mol, preferably in the range of 60 to 75% by mol, and/or the proportion of monomer (a4) in the copolyamide is in the range of 20 to 50% by mol, preferably in the range of 25 to 40% by mol, the proportions of monomers (a3) and (a4) being relative to the sum of the dicarboxylic acids used and adding up in total to 100% by mol.

According to another preferred embodiment
monomer (a1) is selected as 1,6-hexamethylenediamine;
monomer (a2) is selected from the group consisting of bis(4-amino-3-methylcyclohexyl)methane (MACM), bis(4-aminocyclohexyl)methane (PACM) and mixtures thereof, preferably as exclusively bis(4-amino-3-methylcyclohexyl) methane MACM;
monomer (a3) is selected from the group consisting of terephthalic acid, isophthalic acid and mixtures thereof, preferably a mixture in a ratio of 1.5:1 to 1:1.5, particularly preferably an equimolar mixture;
monomer (a4) is selected as dodecanedioic acid.
Preferably the proportions of monomers are thereby selected as follows:
(a1) in the range of 60 to 75% by mol;
(a2) in the range of 25 to 40% by mol;
(a3) in the range of 60 to 75% by mol;
(a4) in the range of 25 to 40% by mol;
the proportions of monomers (a1) and (a2) relating to the sum of the diamines used and adding up in total to 100% by mol, and the proportions of monomers (a3) and (a4) relating to the sum of the dicarboxylic acids used and adding up in total to 100% by mol.

It is thereby generally preferred that, within the scope of component (A), no components based on lactam or amino acids are used. Component (A) is therefore essentially free of (i.e., proportion of less than 2 percent by weight, preferably less than 1 percent by weight, relative to the total mass of (A)), preferably completely free of lactam and/or amino acid components.

A particularly preferred copolyamide (A) is constructed from the following monomers:
(a1) is 1,6-hexamethylenediamine in the range of 60 to 66% by mol;
(a2) is MACM in the range of 34 to 40% by mol;

(a3) an equimolar mixture of terephthalic acid and isophthalic acid in the range of 59 to 65% by mol;

(a4) is dodecanedioic acid in the range of 35 to 41% by mol;

the proportions of monomers (a1) and (a2) relating to the sum of the diamines used and adding up in total to 100% by mol, and the proportions of monomers (a3) and (a4) relating to the sum of the dicarboxylic acids used and adding up in total to 100% by mol.

Furthermore, it is preferred if component (A) has a relative viscosity, determined on solutions of 0.5 g polymer in 100 ml m-cresol according to ISO 307 (2013) at 20° C., of 1.50 to 1.90, particularly preferably of 1.60 to 1.80 and very particularly preferably of 1.65 and 1.80, and/or if component (A) has a glass transition temperature of at least 100° C., preferably of at least 120° C. or 130° C. and particularly preferably of at least 140° C., however thereby preferably of no more than 220° C. or no more than 200° C., the glass transition temperature being determined by means of DSC according to ISO 11357-2 (2013) with a heating rate of 20 K/min.

The copolyamides according to component (A) have no measurable or only very low melting heats (melting enthalpies) of preferably at most 4 J/g, particularly preferably of at most 2 J/g and very particularly preferably of at most 1 J/g (determined according to ISO 11357-3 (2013) on granulate, differential scanning calorimetry (DSC) with a heating rate of 20° C./min.

Component (B)

Component B is at least one partially crystalline polyamide selected from the group comprising PA 516, PA 612, PA 6/12, PA 614, PA 616, PA 618, PA 1012, PA 1014, PA 1016, PA 1018 and mixtures thereof.

According to a preferred embodiment, component (B) is selected from the group consisting of PA 516, PA 612, PA 6/12, PA 616, PA 1012, PA 1014, PA 1016 and mixtures hereof, particularly preferably selected from the group consisting of PA 516, PA 612, PA 6/12, PA 616, PA 1016 and mixtures hereof, and particularly preferably is PA 612 or PA 6/12.

Furthermore, it is preferred if component (B) has a relative viscosity determined on solutions of 0.5 g polymer in 100 ml m-cresol according to ISO 307 (2013) at 20° C. of 1.45 bis 2.40, particularly preferably of 1.60 to 2.30 and very particularly preferably of 1.75 and 2.20 and/or if component (B) has a melting point of 160 to 240° C., preferably of 170 to 230° C. and particularly preferably of 185 to 225° C., the melting point being determined by means of DSC according to ISO 11357-3 (2013) with a heating rate of 20 K/min.

Component (C)

According to a preferred embodiment of the present invention, the additives (C) are selected from the group consisting of inorganic and organic stabilisers, in particular antioxidants, antiozonants, light-protection means, in particular UV stabilisers, UV absorbers or UV blockers, lubricants, colourants, marking means, pigments, carbon black, graphite, graphene, carbon nanotubes, photochromic agents, antistatic agents, mould-release means, condensation catalysts, chain regulators, defoamers, antiblocking means, chain-lengthening additives, optical brighteners, IR absorbers, NIR absorbers, halogen-containing flame retardants, halogen-free flame retardants, natural layer silicates, synthetic layer silicates, metallic pigments, metal flakes, metal-coated particles, particulate fillers, fibrous fillers, nanoscale fillers with a particle diameter ($d_{95}$) of max. 100 nm, determined by means of laser diffraction according to ISO 13320 (2009), and mixtures thereof.

The layer silicates and fillers can be surface-treated. This can take place with a suitable sizing- or adhesive system. For this purpose, for example systems based on fatty acids, waxes, silanes, titanates, polyamides, urethanes, polyhydroxyethers, epoxides, nickel respectively combinations or mixtures thereof can be used.

With respect to fibrous or reinforcing fillers, basically no restrictions exist.

As particulate fillers, all fillers known to the person skilled in the art are possible. There are included herein in particular particulate fillers selected from the group consisting of minerals, talc, mica, dolomite, silicates, quartz, titanium dioxide, wollastonite, kaolin, silicic acids, magnesium carbonate, magnesium hydroxide, chalk, ground glass, glass flakes, ground carbon fibres, ground or precipitated calcium carbonate, lime, feldspar, barium sulphate, zinc sulphide, zinc oxide, permanent-magnetic or magnetisable metals or alloys, glass balls, hollow glass balls, hollow-ball silicate fillers and mixtures hereof.

Another preferred embodiment provides that the fibrous fillers are selected from the group consisting of glass fibres, carbon fibres, metal fibres, aramide fibres, plant fibres, cellulose fibres, in particular nanocellulose fibres, polymer fibres, whiskers, mineral fibres and mixtures hereof and particularly preferred are carbon fibres, metal fibres, aramide fibres, plant fibres, cellulose fibres, in particular nanocellulose fibres, polymer fibres, whiskers, mineral fibres and mixtures hereof.

According to a preferred embodiment of the present invention, component (C) is free of glass fibres.

In a particularly preferred embodiment, component (C) is free of fibrous fillers.

Moulded Articles

The moulded articles according to the invention can be produced from the polyamide moulding compound according to the invention via current processing techniques, such as e.g., injection moulding methods or extrusion methods.

A preferred embodiment of the present invention provides that the moulded article is selected from the group consisting of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g., USB sticks), protective covers for mobile phones, trim parts in the computer and telecommunication field, pipes, hoses, films and components of e-cigarettes.

Uses

Furthermore, the present invention relates to the use of the above-defined polyamide moulding compound according to the invention for the production of decorative elements, in particular in the automobile interior or fashion sphere, sports articles, in particular ski boots, midsoles for sports shoes, leisure articles, toys, in particular construction elements, components, figures or models, household articles, in particular containers, dishes, bowls, tins, beakers, baby bottles or drinking bottles, components of kitchen appliances, components of spectacles, in particular spectacle frames or spectacle sidepieces, in particular for safety goggles, sports goggles or ski goggles, furniture coverings, insoles, construction- and trim parts for appliances in the sanitary, hygiene and cosmetic field, parts for safety shoes, in particular caps, filter cups, inspection glasses, through-flow meters, bursting discs, containers, housings or housing parts for electrical and electronic appliances, in particular for shaving apparatus, depilators, measuring devices, infrared keys, mobile phones, players, personal digital assistants (PDA), smart phones or storage media (e.g., USB sticks), protective covers for mobile phones, trim parts in the computer and telecommunication field, pipes, hoses, films and components of e-cigarettes.

The subject according to the invention is intended to be explained in more detail with reference to the subsequent examples without wishing to restrict said subject to the specific embodiments shown here.

1 MEASURING METHODS

Within the scope of this application, the following measuring methods were used.

Relative Viscosity

The relative viscosity was determined according to ISO 307 (2007) at 20° C. For this purpose, 0.5 g polymer granulate was weighed into 100 ml m-cresol, calculation of the relative viscosity (RV) according to RV=t/$t_0$ was effected in accordance with section 11 of the standard.

Glass Transition Temperature (Tg) and Melting Point

Determination of the glass transition temperature and of the melting point was effected according to ISO 11357-2 and -3 (2013) on granulate. The differential scanning calorimetry (DSC) was implemented at each of the two heatings with a heating rate of 20 K/min. After the first heating, the sample was quenched in dry ice. Glass transition temperature (Tg) and melting point were determined during the second heating. The temperature at peak maximum was indicated as melting point. The average of the glass transition range which was indicated as glass transition temperature (Tg) was determined according to the "Half Height" method.

Modulus of Elasticity in Tension

Determination of the modulus of elasticity in tension was implemented according to ISO 527 (2012) at 23° C. with a tensile speed of 1 mm/min on an ISO tensile bar (type A1, mass 170×20/10×4) produced according to the standard ISO/CD 3167 (2003).

Stress Crack Resistance

Determination of the stress crack resistance was implemented according to DIN 53449-3 (1984) bending strip method on ISO tensile bars, standard: ISO/CD 3167, type A1, 170×20/10×4 mm at a temperature of 23° C. The edge fibre elongation is measured during the 60 second immersion of the ISO tensile bar under stress in the solvent, cracks are visible with the naked eye. For converting the measured edge fibre elongation into the indicated stress, the percentage value of the edge fibre elongation obtained, written as a decimal, is multiplied by the modulus of elasticity in tension (dry, MPa) of the measured material.

Light Transmission and Haze

Light transmission and haze were determined at 23° C. according to ASTM D 1003 (2013) on 60×60 mm plates (width×length) with 2 mm thickness and film gate on a "Haze Gard plus" of the company Byk Gardner with CIE light type C. The light transmission value was indicated in % of irradiated light quantity.

Production of the Test Pieces

For production of the test pieces, granulate with a water content of less that 0.1% by weight was used.

The test pieces were produced on an injection moulding machine of the company Arburg, model Allrounder 420 C 1000-250. Cylinder temperatures rising and falling from the feed to the nozzle were thereby used.

ISO Test Bars
 Cylinder temperatures: 260/265/270/275/280/275° C.
 Mould temperature: 80° C.
 Plates 60×60×2 mm
 Cylinder temperatures: 270/275/280/285/290/285° C.
 Mould temperature: 80° C.

A polished mould was used for the production of the plates.

The test pieces, unless anything else is indicated, were used in the dry state; for this purpose, after the injection moulding, they were stored for at least 48 h at room temperature in a dry environment, i.e., over silica gel.

2 STARTING MATERIALS

The materials used in the examples and comparative examples are compiled in tables 1 and 2.

TABLE 1

| | Materials used in the examples and comparative examples | |
|---|---|---|
| Components | Description | Manufacturer |
| Copolyamide (A) | Amorphous polyamide made of 1,6-hexanediamine (63.0% by mol), bis(3-methyl-4-aminocyclohexyl)methane (37.0% by mol), isophthalic acid (31.0% by mol), terephthalic acid (31.0% by mol) and 1,12-dodecanedioic acid (38.0% by mol) RV 1.71 (measured with 0.5 g in 100 ml m-cresol at 20° C.) glass transition temperature 145° C. | EMS-CHEMIE AG, Switzerland |
| Polyamide (B1) | Partially crystalline linear aliphatic copolyamide made of caprolactam (85% by mol) and laurinlactam (15% by mol) RV 1.87 (measured with 0.5 g in 100 ml m-cresol at 20° C.) melting point 200° C. | EMS-CHEMIE AG, Switzerland |

TABLE 1-continued

Materials used in the examples and comparative examples

| Components | Description | Manufacturer |
|---|---|---|
| Polyamide (B2) | Partially crystalline linear aliphatic polyamide made of 1,6-hexanediamine and 1,16-hexadecanedioic acid RV 1.95 (measured with 0.5 g in 100 ml m-cresol at 20° C.) melting point 195° C. | EMS-CHEMIE AG, Switzerland |
| Polyamide (B3) | Partially crystalline linear aliphatic polyamide made of 1.6-hexanediamine and 1,12-dodecanedioic acid RV 1.80 (measured with 0.5 g in 100 ml m-cresol at 20° C.) melting point 220° C. | EMS-CHEMIE AG, Switzerland |
| Polyamide (B4) | Partially crystalline linear aliphatic polyamide made of laurinlactam RV 1.90 (measured with 0.5 g in 100 ml m-cresol at 20° C.) melting point 178° C. | EMS-CHEMIE AG, Switzerland |

TABLE 2

Materials used in the examples and comparative examples

| Components | Description | Trade name | Manufacturer |
|---|---|---|---|
| Antioxidant 1 | N,N'-hexan-1,6-diylbis[3-(3,5-di-tert-butyl-4-hydroxyphenylpropionamide CAS-no.: 23128-74-7 | Irganox 1098 | BASF SE, Germany |
| Antioxidant 2 | Tris(2,4-ditert-butylphenyl)phosphite CAS-no.: 31570-04-4 | Irgafos 168 | BASF SE, Germany |

3 EXAMPLES AND COMPARATIVE EXAMPLES

3.1 General Production Specification

The production of copolyamides (A) or polyamide (B2) is effected in a known manner in known, agitatable pressure autoclaves with a receptacle and a reaction vessel.

In the receptacle, deionised water is received and the monomers and any additives are added. Thereafter, the solution is made inert multiple times with nitrogen gas. With agitation, heating takes place to 180 to 230° C. under adjusting pressure in order to obtain a homogeneous solution. This solution is pumped through a sieve into the reaction vessel and heated there to the desired reaction temperature of 270 to 310° C. at a pressure of max. 30 bar. The batch is retained in the pressure phase for 2 to 4 hours at the reaction temperature. In the subsequent pressure-reducing phase, the pressure is reduced to atmospheric pressure within 1 to 2.5 hours, the temperature being able to drop slightly. In the following degassing phase, the batch is retained at atmospheric pressure for 1 to 2.5 hours at a temperature of 270 to 300° C. The polymer melt is discharged in strand form, cooled in the water bath at 15 to 80° C. and granulated. The granulate is dried at 80 to 120° C. under nitrogen or in a vacuum to a water content of less than 0.1% by weight.

Suitable catalysts for accelerating the polycondensation reaction are phosphorus-containing acids, such as for example $H_3PO_2$, $H_3PO_3$, $H_3PO_4$, the salts thereof or organic derivatives. The catalysts are added in the range of 0.01 to 0.5% by weight, preferably 0.03 to 0.1% by weight, relative to the polyamide.

Suitable defoamers for avoiding the formation of foam during degassing are aqueous 10% emulsions which include silicones or silicone derivatives and are used in quantities of 0.01 to 1.0% by weight, preferably 0.01 to 0.10% by weight, relative to the polyamide.

Adjustment of the relative viscosity and hence the molar mass can be effected in a known manner, e.g., via monofunctional amines or carboxylic acids, and/or difunctional diamines or dicarboxylic acids as chain regulators. The chain regulators can be used individually or in combination. The normal usage quantity of the monofunctional chain regulators is at 0.1 to 2% by mol, relative to 100% by mol for the polyamide.

3.2 General Production- and Processing Specification for the Polyamide Moulding Compounds For production of the polyamide moulding compound according to the invention, components (A), (B) and possibly (C) are mixed on normal compounding machines, such as e.g., single- or twin-screw extruders or screw kneaders. The components are thereby metered individually via gravimetric or volumetric metering scales into the feed or respectively into a side feeder or supplied in the form of a dry blend.

If additives (component (C)) are used, these can be introduced directly or in the form of a master batch. The carrier material of the master batch concerns preferably a polyamide or a polyolefin. Amongst the polyamides, there is suitable in particular for this purpose the polyamide of the respective component (A).

For the dry blend production, the dried granulates of components (A), (B) and possibly (C) are mixed in a closed container. This mixture is homogenised by means of a tumble mixer, eccentric mixer or tumble dryer for 10 to 40 minutes. In order to avoid moisture absorption, this can be effected under dried protective gas.

TABLE 3

Examples and comparative examples

| Components | Unit | Examples | | | | Comparative examples | | | |
| --- | --- | --- | --- | --- | --- | --- | --- | --- | --- |
| | | 1 | 2 | 3 | 4 | 5 | 6 | 7 | 8 |
| Copolyamide (A) | % by weight | 94.65 | 89.65 | 89.65 | 79.65 | 89.65 | 79.65 | 89.65 | 99.65 |
| Polyamide (B1) | % by weight | 5 | 10 | — | — | — | — | — | — |
| Polyamide (B2) | % by weight | — | — | 10 | 20 | — | — | — | — |
| Polyamide (B3) | % by weight | — | — | — | — | 10 | 20 | — | — |
| Polyamide (B4) | % by weight | — | — | — | — | — | — | 10 | — |
| Antioxidant 1 | % by weight | 0.25 | 0.25 | 0.25 | 0.25 | 0.25 | 0.25 | 0.25 | 0.25 |
| Antioxidant 2 | % by weight | 0.1 | 0.1 | 0.1 | 0.1 | 0.1 | 0.1 | 0.1 | 0.1 |
| Measured values | | | | | | | | | |
| Haze | % | 0.8 | 0.7 | 4.5 | 9.6 | 0.5 | 0.6 | 99.0 | 0.6 |
| Light transmission | % | 92.7 | 92.5 | 85.8 | 82.4 | 93.2 | 93.2 | 58.5 | 93.0 |
| Modulus of elasticity in tension | MPa | 2,350 | 2,370 | 2,130 | 2,110 | 2,180 | 2,150 | 2,210 | 2,300 |
| Stress crack resistance | | | | | | | | | |
| diethylene glycol | MPa | 29 | 29 | 37 | 36 | 27 | 27 | 22 | 12 |
| toluene | MPa | 29 | 36 | 42 | 31 | 33 | 37 | 27 | 17 |
| n-hexane | MPa | 24 | 36 | 69 | 73 | 65 | 48 | 59 | 23 |

The compounding is effected at set cylinder temperatures of 250 to 300° C., the temperature of the first cylinder being able to be set below 170° C. Degassing can take place in front of the nozzle. This can be effected by means of vacuum or atmospherically. The melt is discharged in strand form, cooled in the water bath at 10 to 80° C. and subsequently granulated. The granulate is dried at 80 to 120° C. under nitrogen or in a vacuum to a water content of below 0.1% by weight.

Processing of the polyamide moulding compounds according to the invention by injection moulding is effected at cylinder temperatures of 260 to 300° C., a temperature profile rising and falling from the feed to the nozzle being able to be used. The mould temperature is set to a temperature of 40 to 120° C., preferably 60 to 100° C.

3.3 Production of the Polyamide Moulding Compound According to Example 1

The dried granulates of components (A) and (B) and additives (C) were mixed to form a dry blend, and in fact in the ratio indicated in table 3. This mixture was homogenised for approx. 20 minutes by means of a tumble mixer.

The polyamide moulding compound was produced on a twin-screw extruder of the company Collin type ZK 25T TL. The dry blend was thereby metered into the feed via metering scales.

The temperature of the first housing was set to 150° C., that of the remaining housings to 270 to 290° C. A speed of rotation of 150 rpm and a throughput of 4 kg/h was used. Degassing did not take place. The melt strand was cooled in the water bath, cut, and the obtained granulate was dried at 90° C. for 24 h in a vacuum (30 mbar) to a water content of below 0.1% by weight.

3.4 Examples and Comparative Examples

In the following table 3, the results of the examples and comparative examples according to the present invention are compiled.

4 DISCUSSION OF THE RESULTS

Examples 1 to 6 according to the invention relate to polyamide moulding compounds in which amorphous copolyamide (A), according to the claim, is used with the partially crystalline polyamides, according to the claim, PA 6/12 (E1), PA 616 (E2) or PA 612 (E3).

Comparative example 7 relates to a blend of amorphous copolyamide (A), according to the claim, with the partially crystalline polyamide PA 12, not according to the claim, and comparative example 8 relates to a polyamide moulding compound made of copolyamide (A).

The examples according to the invention show very good stress crack resistance in different solvents and very good optical properties, expressed by a high light transmission and a low haze.

The mixture of amorphous copolyamide (A) and PA 12 according to CE7 in fact leads to a stress crack resistance which is increased compared with pure copolyamide (CE8) but the optical properties are significantly impaired. The polyamide moulding compound according to CE8, on the other hand, has in fact good optical properties but shows a significantly impaired stress crack resistance.

Very good stress crack resistance and very good optical properties are achieved only by the specific feature combination according to the invention.

The invention claimed is:
1. A polyamide moulding compound comprising:
  (A) 50 to 98% by weight of at least one amorphous copolyamide formed from monomers (a1) to (a4);
    (a1) 50 to 80% by mol of at least one acyclic, aliphatic diamine with 6 to 10 carbon atoms;
    (a2) 20 to 50% by mol of at least one cycloaliphatic diamine with 6 to 36 carbon atoms;
    (a3) 40 to 80% by mol of at least one aromatic dicarboxylic acid; and

(a4) 20 to 60% by mol of at least one acyclic, aliphatic dicarboxylic acid with 8 to 16 carbon atoms;

the proportions of monomers (a1) and (a2) being relative to the sum of diamines and adding up in total to 100% by mol; and the proportions of monomers (a3) and (a4) being relative to the sum of dicarboxylic acids and adding up in total to 100% by mol;

(B) 2 to 40% by weight of at least one partially crystalline polyamide selected from the group consisting of PA 612, PA 6/12, PA 516, PA 614, PA 616, PA 618, PA 1012, PA 1014, PA 1016, PA 1018; and (C) 0 to 20% by weight of at least one additive selected from the group consisting of inorganic and organic stabilisers, antiozonants, light-protection agents, lubricants, colourants, marking agents, pigments, carbon black, graphite, graphene, carbon nanotubes, photochromic agents, antistatic agents, mould-release agents, condensation catalysts, chain regulators, defoamers, antiblocking agents, chain-lengthening additives, optical brighteners, IR absorbers, NIR absorbers, halogen-containing flame retardants, halogen-free flame retardants, natural layer silicates, synthetic layer silicates, metallic pigments, metal flakes, metal-coated particles, particulate fillers, fibrous fillers, and nanoscale fillers with a particle diameter (d95) of max. 100 nm, determined by laser diffraction according to ISO 13320 (2009);

the quantities of components (A) to (C) adding up in total to 100% by weight, wherein a test piece made of the polyamide moulding compound has a stress crack resistance in diethylene glycol, determined according to DIN 53449-3 (1984) bending strip method, of at least 22 MPa.

2. The polyamide moulding compound according to claim 1, wherein:

the proportion of component (A) in the polyamide moulding compound is in the range of 55 to 95.9% by weight, and/or the proportion of component (B) in the polyamide moulding compound is in the range of 4 to 35% by weight, relative to the total weight of the polyamide moulding compound, and/or the proportion of component (C) in the polyamide moulding compound is in the range of 0.1 to 20% by weight, respectively relative to the total weight of the polyamide moulding compound.

3. The polyamide moulding compound according to claim 2, wherein:

the proportion of component (A) in the polyamide moulding compound is in the range of 69 to 94.7% by weight, relative to the total weight of the polyamide moulding compound, the proportion of component (B) in the polyamide moulding compound is in the range of 5 to 25% by weight, relative to the total weight of the polyamide moulding compound, and/or the proportion of component (C) in the polyamide moulding compound is in the range of 0.3 to 6% by weight, respectively relative to the total weight of the polyamide moulding compound.

4. The polyamide moulding compound according to claim 1, wherein:

monomer (a1) is a linear or branched diamine with 6 to 8 carbon atoms, and/or monomer (a2) is a cycloaliphatic diamine with 12 to 20 carbon atoms, and/or monomer (a3) is an aromatic dicarboxylic acid with 6 to 36 carbon atoms, and/or monomer (a4) is an acyclic, linear or branched aliphatic dicarboxylic acid with 10 to 14 carbon atoms.

5. The polyamide moulding compound according to claim 4, wherein:

monomer (a1) is 1,6-hexamethylenediamine and/or 2-methyl-1,5-pentanediamine; and/or monomer (a2) is selected from the group consisting of bis(4-amino-3-methylcyclohexyl)methane (MACM), bis(4-aminocyclohexyl)methane (PACM), 2,2-bis(4-aminocyclohexyl)propane (PACP), 2,2-bis(4-amino-3-methylcyclohexyl)propane (MACP), bis(4-amino-3-ethylcyclohexyl)methane (EACM), 2,2-bis(4-amino-3-ethylcyclohexyl)propane (EACP), bis(4-amino-3,5-dimethycyclohexyl)methane (TMACM), 2,2-bis(4-amino-3,5-dimethycyclohexyl)propane (TMACP) and mixtures thereof, and/or monomer (a3) is selected from the group consisting of terephthalic acid (TPS), isophthalic acid, naphthalenedicarboxylic acid (NDA), biphenyldicarboxylic acids, 4,4'-diphenyletherdicarboxylic acid, 4,4'-diphenylmethanedicarboxylic acid, 4,4'-diphenylsuphonedicarboxylic acid, 1,5-anthracenedicarboxylic acid, p-terphenylene-4,4"-dicarboxylic acid, 2,5-pyridinedicarboxylic acid and mixtures thereof, and/or monomer (a4) is selected from the group consisting of decanedioic acid, undecanedioic acid, dodecanedioic acid, tridecanedioic acid, tetradecanedioic acid and mixtures thereof.

6. The polyamide moulding compound according to claim 1, wherein monomer (a3) is a mixture of terephthalic acid and isophthalic acid.

7. The polyamide moulding compound according to claim 6, wherein the mixture of terephthalic acid and isophthalic acid is present in a molar ratio of 2:1 to 1:2.

8. The polyamide moulding compound according to claim 1, wherein:

the proportion of monomer (a1) in the copolyamide is in the range of 55 to 80% by mol, and/or the proportion of monomer (a2) in the copolyamide is in the range of 20 to 45% by mol, the proportions of monomers (a1) and (a2) being relative to the sum of diamines and adding up in total to 100% by mol, and/or the proportion of monomer (a3) in the copolyamide is in the range of 50 to 80% by mol, and/or the proportion of monomer (a4) in the copolyamide is in the range of 20 to 50% by mol, the proportions of monomers (a3) and (a4) being relative to the sum of dicarboxylic acids and adding up in total to 100% by mol.

9. The polyamide moulding compound according to claim 1, wherein:

monomer (a1) is 1,6-hexamethylenediamine;

monomer (a2) is selected from the group consisting of bis(4-amino-3-methylcyclohexyl)methane (MACM), bis(4-aminocyclohexyl)methane (PACM) and mixtures thereof;

monomer (a3) is selected from the group consisting of terephthalic acid, isophthalic acid and mixtures thereof; and monomer (a4) is dodecanedioic acid.

10. The polyamide moulding compound according to claim 9, wherein the proportions of monomers are:

(a1) in the range of 60 to 75% by mol;
(a2) in the range of 25 to 40% by mol;
(a3) in the range of 60 to 75% by mol; and
(a4) in the range of 25 to 40% by mol;
the proportions of monomers (a1) and (a2) being relative to the sum of diamines and adding up in total to 100% by mol; and
the proportions of monomers (a3) and (a4) being relative to the sum of dicarboxylic acids and adding up in total to 100% by mol.

11. The polyamide moulding compound according to claim 1, wherein:
the fibrous fillers are selected from the group consisting of glass fibres, carbon fibres, metal fibres, aramide fibres, plant fibres, cellulose fibres, polymer fibres, whiskers, mineral fibres and mixtures thereof.

12. The polyamide moulding compound according to claim 1, wherein:
the partially crystalline polyamide (B) is selected from the group consisting of PA 516, PA 612, PA 6/12, PA 616, PA 1012, PA 1014, PA 1016, and mixtures thereof.

13. The polyamide moulding compound according to claim 12, wherein:
the partially crystalline polyamide (B) is PA 612 or PA 6/12.

14. The polyamide moulding compound according to claim 1, wherein:
the polyamide moulding compound comprises precisely one copolyamide (A) and precisely one partially crystalline polyamide (B).

15. The polyamide moulding compound according to claim 1, wherein:
the haze of the polyamide moulding compound, measured on a moulded article produced from the polyamide moulding compound (2 mm thick plates with width and length: 60×60 mm) according to ASTM D1003, is <15%; and/or
the transparency, measured on a moulded article produced from the polyamide moulding compound (2 mm thick plates with width and length: 60×60 mm) according to ASTM D1003, is at least 80%.

16. The polyamide moulding compound according to claim 1, wherein:
a test piece made of the polyamide moulding compound:
has a modulus of elasticity in tension, determined according to ISO 527, of at least 2,000 MPa, and/or
has a stress crack resistance in diethylene glycol, determined according to DIN 53449-3 (1984) bending strip method, of at least 27 MPa, and/or
has a stress crack resistance in toluene, determined according to DIN 53449-3 (1984) bending strip method, of at least 17 MPa, and/or
has a stress crack resistance in n-hexane, determined according to DIN 53449-3 (1984) bending strip method, of at least 23 MPa.

17. A moulded article comprising a polyamide moulding compound according to claim 1.

18. The moulded article according to claim 17, which is selected from the group consisting of decorative elements, sports articles, midsoles for sports shoes, leisure articles, toys, household articles, components of kitchen appliances, components of spectacles, furniture coverings, insoles, construction- and trim parts for appliances in the sanitary, hygiene and cosmetic field, parts for safety shoes, filter cups, inspection glasses, through-flow meters, bursting discs, containers, housings or housing parts for electrical and electronic appliances, depilators, measuring devices, infrared keys, mobile phones, players, personal digital assistants (PDA), smart phones or storage media, protective covers for mobile phones, trim parts in the computer and telecommunication field, pipes, hoses, films, and components of e-cigarettes.

19. A method of producing a moulded article comprising moulding a polyamide moulding compound according to claim 1.

* * * * *